Figures 1, 2, 3, 4, 5, 6:
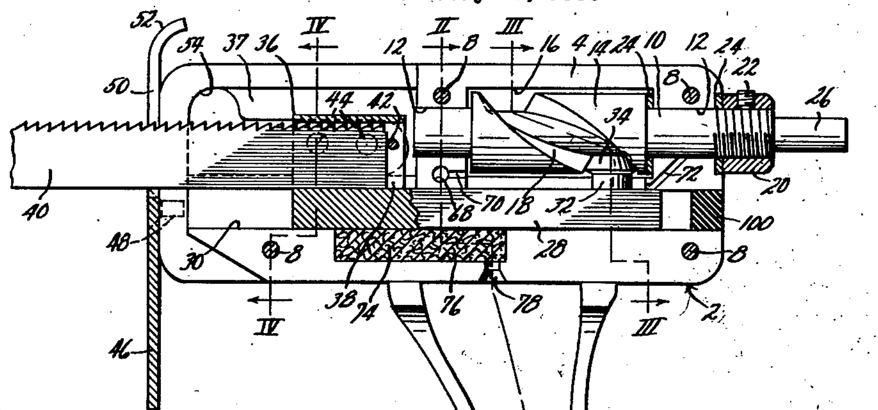

Dec. 17, 1957 T. HILL 2,816,583

RECIPROCAL TOOL ADAPTOR FOR ROTARY POWER DEVICES

Filed July 16, 1956

INVENTOR.
Thomas Hill

BY Hamilton & Hamilton
Attorneys.

2,816,583
Patented Dec. 17, 1957

2,816,583

RECIPROCAL TOOL ADAPTOR FOR ROTARY POWER DEVICES

Thomas Hill, Kansas City, Mo.

Application July 16, 1956, Serial No. 598,145

1 Claim. (Cl. 143—68)

This invention relates to new and useful improvements in power conversion attachments, and has particular reference to a device operable to convert rotary motion into reciprocal motion.

The principal object of the present invention is the provision of an attachment for hand drills, drill press, or other such implements operable normally to produce a rotary tool action, and to convert such rotary action into a reciprocal movement adapted to operate such tools as saws, files, chippers, nibblers and the like. The fact that I have shown the device in connection with a saw is not intended to be restrictive in any way, as it will be apparent that the device is usable in connection with any tool requiring a rapid reciprocating movement.

Other objects are simplicity and economy of construction, efficiency and dependability of operation, convenience of mounting, ruggedness and long life.

With these objects in view, as well as other objects which will appear in the course of the specification, reference will be had to the drawing, wherein:

Fig. 1 is a vertical, longitudinal midsectional view of an adaptor embodying the present invention, with a fragmentarily shown saw blade mounted therein, Fig. 2 is a sectional view taken on line II—II of Fig. 1, Fig. 3 is a sectional view taken on line III—III of Fig. 1, Fig. 4 is a sectional view taken on line IV—IV of Fig. 1, Fig. 5 is a reduced side elevational view of the adaptor attached operatively to a hand drill motor, and Fig. 6 is a reduced side elevational view of the adaptor attached operatively in a drill press.

Like reference numerals apply to similar parts throughout the several views, and the numeral 2 applies to a body member which is formed of steel or other suitable material and has the form generally of a rectilinear block. As shown, it is split along its major axis into two halves 4 and 6 which are joined releasably together by a plurality of screws 8. A drive shaft 10 is disposed rotatably in the upper rear portion of said body member parallel to the axis thereof, being journalled adjacent each end thereof in a pair of matching semi-cylindrical bearing recesses 12 formed in the mating surfaces of body members 4 and 6 (see Figs. 1 and 2). Intermediate said bearings, shaft 10 is enlarged in diameter to form a drive member 14 which is enclosed in an enlarged chamber 16 formed in the body member. Said drive member has a peripheral groove 18 formed in the cylindrical surface thereof, said groove lying in a plane inclined obliquely to the axis of the drive shaft, for a purpose which will appear. The drive shaft extends rearwardly from the body member, and has a collar 20 threaded adjustably thereon and provided with a set screw 22. A pair of fiber washers 24 are carried on the drive shaft and are disposed respectively between drive member 14 and the rearward wall of chamber 16, and between collar 20 and body member 2. The extreme outer end portion 26 of the drive shaft is reduced in diameter.

A tool bar 28 of rectangular cross-sectional shape is carried in the body member beneath and parallel to drive shaft 10, being carried for longitudinal sliding movement in a pair of matching grooves 30 formed respectively in the mating surfaces of body sections 4 and 6. Adjacent its rearward end, said bar has affixed therein an upwardly extending pin 32 on which is rotatably mounted a tapered roller 34 which is engaged in groove 18 of drive member 14, as shown. At its forward end, the tool bar is provided with an integral upward extension 36 having the form generally of a rectangular block. Said extension is disposed within a recess 37 of body member 2, said recess opening through the top and front end walls of the body member. Said tool bar extension has a hole 38 formed therethrough parallel with the axis of the tool bar. A saw blade 40 is inserted rearwardly into said hole, its entry being limited by a pin 42 extending between the side walls of the extension, said blade being fixed in position by a pair of set screws 44 threaded in a side wall of the extension. The blade extends well forwardly of the body member. A planar shoe 46, for engaging the work and assisting in steadying the tool, is affixed to the forward end of the body member by a pair of screws 48, and is disposed in a plane at right angles to the axis of the tool. It of course is slotted at 50 to accommodate the saw blade 40, and is curved at its upper edge, as indicated at 52 to assist in rocking the tool relative to the work, when such a movement is desirable. It will be seen also that body sections 4 and 6 are each provided with a window 54 formed therein and communicating with recess 37. These windows both provide access to blade set screws 44, and also permit better vision of the working zone of the tool.

A transversely projecting handle 56 is attached intermediate the ends of body member 2. As best shown in Fig. 2, said handle is also split vertically into two sections 58 and 60, and is hollow. Adjacent their lower ends, said handle sections are joined by a screw 62, and at their upper ends they overlap the sides of the body member 2 and are joined respectively to body sections 4 and 6 by screws 64. Intermediate its ends, said handle has a hole 66 formed therethrough parallel to the axis of the tool for a purpose to be described. It will be noted that screws 64 by which the handle is secured to the body member are disposed exactly midway between the upper and lower edges of the body member. This permits the handle to be removed and disposed to extend above the body member, whenever necessary or desirable for greater convenience of use.

It will be noted also that the body member hole 68 into which screws 64 are threaded extends all the way through the body member (see Figs. 1 and 2). A groove 70 formed in the inner face of body section 4 interconnects hole 68 with body chamber 16 which contains drive member 14. Thus by removing either one of screws 64, oil may be introduced through hole 68 and groove 70 to chamber 16 for lubrication of the working parts. Similarly, a groove 72 formed in the inner face of body member 4 interconnects chamber 16 with the rear bearing 12 of drive shaft 10, whereby to lubricate said bearing. The slideway 30 of tool bar 28 is further lubricated by means of a felt or fibrous wick 74 contained in a recess 76 of the body member disposed just beneath said slideway, said wick having a wiping contact with the tool bar. Oil is introduced into said wick through a hole 78 communicating with recess 76 and extending through the bottom wall of the body member.

In use, the reduced end portion 26 of the drive shaft is gripped either in the chuck 80 of a hand drill motor 82, or with the chuck 84 of a drill press, as shown respectively in Figs. 6 and 5. When used in connection with a hand drill motor, the operator grasps the hand grip 86 of the motor unit with one hand, and grasps the handle 54 of my adaptor with the other hand, both in order to prevent rotation of the body member 2 with the drive shaft, and to guide the saw blade 40 or other tool as desired. When used in connection with a drill press, the stop bar 88 of the drill press, which is attached to the non-rotating ram 90 of the press by bracket 92, is positioned to extend downwardly through hole 66 in the handle of my adaptor unit. Handle section 60 is provided with a series of tapped holes 94 in alignment with hole 66. A set screw 96 may be threaded selectively into any one of holes 94 to engage stop bar 88 and thus hold body member 2 firmly against rotation. When used with a hand drill, a saw blade 40 is preferably used in which the teeth slope toward body member 2, as in Figs. 1 and 6, in order that the work will be held firmly against shoe 46 during the cutting stroke of the blade. When used in a drill press, the saw teeth preferably should slope away from the body member, so that the work is pressed downwardly against the drill press bed 98 during the cutting stroke of the blade.

It will of course be apparent that as the drive shaft 10 is rotated, the action of oblique groove 18 on roller 34 will cause a reciprocal motion of tool bar 28 and to the saw blade or other tool carried thereby. Fiber washers 24 support the drive shaft against end thrust in either direction, and provide a quieter, smoother operation. Collar 20 may be adjusted, after loosening set screw 22, to take up any end play of the shaft which may develop due to wear of the parts. All working parts are formed of very hard metal, or are surface hardened, in order to resist wear. All working parts are lubricated as previously described. The rearward end of slideway 30 of the tool bar is closed by a rubber plug 100, in order to prevent loss of lubricant, and also to prevent entry of dirt or other foreign matter. The tapered shape of roller 34, and the corresponding taper of the walls of the cooperating groove 18, compensates for the different linear speeds of the drive member 14 at the root and crest of groove 18, and thus permits smooth rolling contact with the roller across the entire width of its face. This prevents friction between the roller and groove, and thereby prevents uneven wear of these parts.

While I have shown and described a specific embodiment of my invention, it will be apparent that many minor changes of structure and operation could be made without departing from the spirit of the invention as defined by the scope of the appended claim.

What I claim as new and desire to protect by Letters Patent is:

A power conversion adaptor comprising a body member, a drive shaft mounted in said body member and adapted to be rotatably driven, a tool bar mounted in said body member for reciprocal movement adjacent and parallel to said drive shaft, said tool bar having means for attaching a reciprocal tool thereto, an operative connection between said drive shaft and said tool bar, whereby rotation of the former will cause reciprocal movement of the latter, said drive shaft being adapted to be chucked in a hand drill motor unit or a drill press to be rotatively driven thereby, and a handle secured to said body member and projecting outwardly therefrom transversely to said drive shaft, whereby said body member may be manually restrained against rotation with said drive shaft, and whereby a tool carried by said tool bar may be manually guided, said handle having an aperture formed therethrough parallel to but spaced apart from said drive shaft, said aperture being adapted to receive the stop bar of a drill press whereby rotation of said body member with said drive shaft is prevented.

References Cited in the file of this patent

UNITED STATES PATENTS

| | | |
|---|---|---|
| 766,970 | Pfanschmidt | Aug. 9, 1904 |
| 1,197,591 | Bargery | Sept. 12, 1916 |
| 1,351,753 | Hover | Sept. 7, 1920 |
| 2,282,728 | Kern | May 12, 1942 |
| 2,347,364 | Palumbo | Apr. 25, 1944 |
| 2,436,692 | Greene | Feb. 24, 1948 |
| 2,525,922 | Mandl | Oct. 17, 1950 |

FOREIGN PATENTS

| | | |
|---|---|---|
| 100,137 | Sweden | Oct. 29, 1940 |
| 230,538 | Switzerland | Mar. 16, 1944 |